United States Patent
Okumoto et al.

(10) Patent No.: US 7,573,175 B2
(45) Date of Patent: Aug. 11, 2009

(54) TANDEM AC GENERATOR FOR VEHICLE

(75) Inventors: Kazushige Okumoto, Kariya (JP); Shin Kusase, Oobu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/797,844

(22) Filed: May 8, 2007

(65) Prior Publication Data

US 2007/0273242 A1 Nov. 29, 2007

(30) Foreign Application Priority Data

May 23, 2006 (JP) ............................. 2006-142813

(51) Int. Cl.
 *H02K 47/00* (2006.01)
 *H02K 1/22* (2006.01)
 *H02K 9/06* (2006.01)
(52) U.S. Cl. .................. 310/263; 310/112; 310/156.71; 310/65; 310/89
(58) Field of Classification Search .................. 310/112, 310/156.66, 156.71, 156.73, 263, 89, 65, 310/101; *H02K 16/00, 9/01*
See application file for complete search history.

(56) References Cited

U.S. PATENT DOCUMENTS

| | | | |
|---|---|---|---|
| 3,459,980 A * | 8/1969 | Coroller | 310/114 |
| 3,862,444 A * | 1/1975 | Hale | 310/74 |
| 6,034,456 A * | 3/2000 | Osama et al. | 310/90.5 |
| 2005/0236920 A1 * | 10/2005 | Kusase et al. | 310/168 |

FOREIGN PATENT DOCUMENTS

| | | |
|---|---|---|
| JP | A-56-112866 | 9/1981 |
| JP | A-05-083906 | 4/1993 |
| JP | 05268752 A * | 10/1993 |
| JP | 05308751 A * | 11/1993 |
| JP | 11098789 A * | 4/1999 |
| JP | A-2005-229748 | 8/2005 |
| JP | 2007295664 A * | 11/2007 |

OTHER PUBLICATIONS http://www.nationsautoelectric.com/function.html (Apr. 29, 2006) alternator.pdf.*
JP 05308751A, English machine translation.*
(http://www.nationsautoelectric.com/function.html) alternator.pdf.*
Kuriyama et al (JPA 05308751, English translated).*
alternator.pdf (www.nationsautoelectric.com/function.html, wayback machine date of Apr. 29, 2006, printed Jan. 31, 2008).*
JPA 1993308751 _EN.pdf : Kuriyama et al (JPA 05308751, English translated completed on Jan. 24, 2008).*

* cited by examiner

*Primary Examiner*—Quyen Leung
*Assistant Examiner*—John K Kim
(74) *Attorney, Agent, or Firm*—Oliff & Berridge, PLC

(57) ABSTRACT

In a tandem AC generator for a vehicle having dual armature core-Lundel type field core pairs placed in series, an intermediate ring as a cylindrical spacer is placed between the dual armature cores. One armature core, the intermediate ring, and the other armature core are pressed and tightly fastened to each other in the direction of a rotary shaft by front and rear housings by a through bolt. A circumference wall part of the front housing accommodates one armature core and the intermediate ring completely and further accommodates a part of an outer circumference surface of the other armature core. This simple construction of the tandem AC generator provides improved and superior vibration proof.

6 Claims, 2 Drawing Sheets

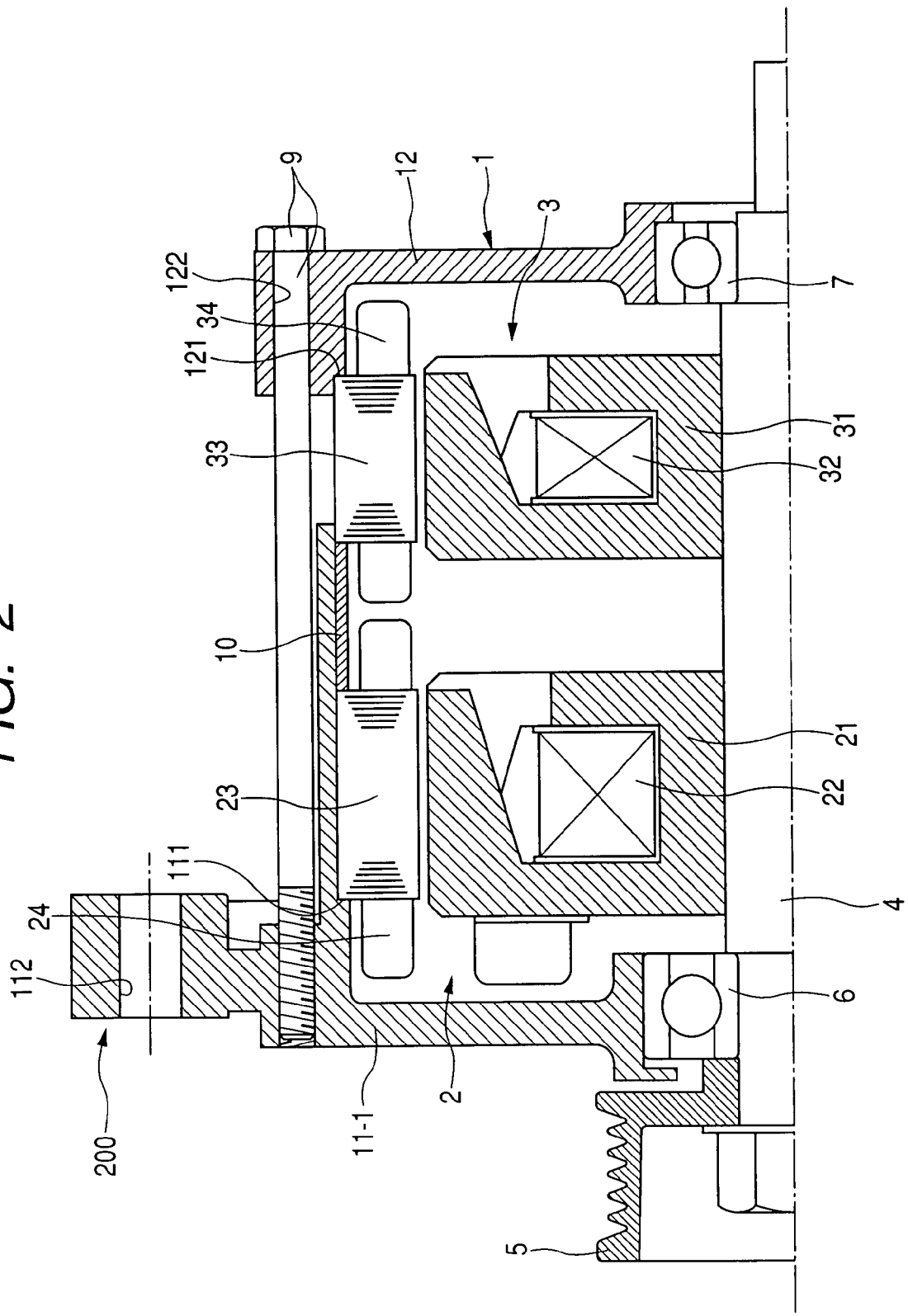

TANDEM AC GENERATOR FOR VEHICLE

CROSS-REFERENCE TO RELATED APPLICATION

This application is related to and claims priority from Japanese Patent Application No. 2006-142813 filed on May 23, 2006, the contents of which are hereby incorporated by reference.

BACKGROUND OF THE INVENTION

1. Field of the Invention

The present invention relates to a tandem AC generator for a vehicle (or a tandem vehicle alternator in short) capable of supplying different output voltages such as a high voltage and a low voltage.

2. Description of the Related Art

There have been proposed various types of manners of fixing dual armatures in a tandem AC generator. In the tandem AC generator, dual armature-Lundel type field winding pairs are placed in series along the direction of a rotary shaft.

One of the related-art manners, Japanese patent laid open publication number JP S56-112866 has disclosed a manner of fixing in series a primary housing, a primary armature, an intermediate spacer and a secondary housing. In the manner, a secondary armature is fixed to a position different from the positions of fixing the primary housing, the primary armature, the intermediate spacer and the secondary housing. Such a related-art manner of fixing the armatures decreases the accuracy of core axis by accumulating the tolerance of each component forming the AC generator. This increases the difference of the axis core of dual stators along the direction of the diameter. Still further, this related-art manner has a drawback in that it is too easy to shift the Lundel type field windings because the primary and secondary housings supporting the Lundel type field windings are easily shifted in the direction of the diameter.

Another related art document, Japanese patent laid open publication JP H05-83906 has disclosed another fixing manner in which a single housing supports dual armatures and a through bolt does not fasten the armatures in the axis direction of a rotary shaft. Accordingly, this manner has a drawback of being difficult to fix the armatures in the axis direction surrounded by the housing.

In order to solve the drawback of the related art, Japanese patent laid open publication JP 2005-229748 (the same assignee with the present invention) has proposed an improved manner to place an intermediate housing between dual armatures, and to place the intermediate housing and dual armatures between a front housing and a rear housing and to fasten them by through bolts in the axis direction. (Hereinafter, this connection manner will be referred to as "a through-bolt fastening manner"). This manner prevents the decrease of accuracy of the axis core by the components forming the tandem AC generator.

However, because fixing the armature based on the through-bolt fastening manner described above uses the intermediate housing between the dual armatures in the tandem AC generator, the accuracy of axis core between the housing and the armatures is decreased, and this manner introduces the difficulty to tightly fasten the armatures toward the axis direction of the rotary shaft in the tandem AC generator. In addition, the related art manner has a drawback of increasing the outer diameter and the total weight of the tandem AC generator by the presence of the intermediate housing. When the intermediate housing of a thin thickness is used in order to eliminate the drawback described above, the entire strength and durability of the tandem AC generator is decreased.

SUMMARY OF THE INVENTION

It is an object of the present invention to provide an improved tandem AC generator for a vehicle equipped with dual armature-field winding pairs with improved assembling-accuracy without having a complicated configuration, and without increasing the entire size.

To achieve the above purposes, the present invention provides a tandem AC generator for a vehicle having dual Lundel type field cores, dual armature cores, front and rear housings, and a cylindrical spacer. Each Lundel type field core has a field winding wound thereon. The dual Lundel type field cores are fixed in series to a common rotary shaft. Each armature core has a cylindrical shape and has an armature winding wound thereon. The dual armature cores are placed in a diameter direction at the outside of the dual Lundel type field cores, respectively. Each of the front and rear housings is made of non-magnetic substance placed in an axis direction at the outside of the armature core. The front and rear housings forcedly press the dual armature cores in the direction of the common rotary shaft by a through bolt. Each housing has an end wall part and a circumference wall part and rotatably supports the common rotary shaft, an inner circumference surface of the front housing has a step-shaped surface to which a front end surface of one armature core is engaged. An inner circumference surface of the rear housing has a step-shaped surface to which a rear end surface of the other armature core is engaged. The cylindrical spacer is placed between the dual armature cores. In the tandem AC generator, the circumference wall part of one housing having a long-sized circumference wall in the front and rear housings accommodates the entire of one armature core in the dual armature cores and reaches the outer circumference surface of the other armature core, and is separated in the axis direction at a predetermined interval from the circumference wall part of the other housing on the outer circumference part of the other armature core. In the front and rear housings, the housing having a long-sized circumference wall part and the housing having a short-sized circumference wall part will be referred to as "a long circumference wall housing" and "a short circumference wall housing" respectively. The spacer of a cylindrical shape is placed between the dual armature cores. Those dual armature cores and the cylindrical spacer are placed between the front and rear housings, and the front and rear housings are fastened by the through bolt. In particular, the present invention adopts the configuration to insert the dual armature cores into the inner circumference surface of the front and rear housings. This configuration enables the tandem AC generator to efficiency coincide the axis of the armature cores to each other and thereby to determine the position in the diameter direction of the outer circumference surface of each armature core based on the core of the axis of the long circumference-wall housing. It is thereby possible to reduce the difference of the axis in the diameter direction between the armature cores.

In the tandem AC generator of the present invention, because the boundary part between the cylindrical spacer and the end surfaces of the dual armature cores are surrounded by the circumference wall part of the long circumference wall housing, it is possible to efficiently protect the boundary part between the cylindrical spacer and the end surfaces of the dual armature cores. By the way, the cylindrical spacer is capable of determining a space in the axis direction between the dual armature cores and capable of transmitting to the dual armature cores the fastening force in the axis direction of the through bolt. The improvement of co-aligning the core of the axis of the dual armature cores is very important from the point of view of accurately keeping the space (namely, an electromagnetic gap) between the dual armature cores and corresponding dual rotors. Still further, because both of the dual armature cores are inserted into the circumference wall parts of the long circumference-wall housing, this configuration can improve the stress proof against any outer stress to be applied to the diameter direction of the tandem AC generator. This feature can improve the vibration proof capability in the diameter direction of the dual armature cores. Still further, the armature core completely surrounded by the long circumference-wall housing is capable of discharging thermal energy through the long circumference-wall housing to the outside of the tandem AC generator because the configuration of the dual armature cores and the long circumference-wall housing provides a high thermal conductivity. It is further possible to decrease the amount of electromagnetic radiation by the configuration in which the long circumference-wall housing surrounds the both of the dual armature cores.

In the tandem AC generator according to another aspect of the present invention, the housing having a long-sized circumference wall (as the long circumference-wall housing described above) is placed at a pulley side fixed to the rotary shaft to which a torque is supplied. By the way, the rotary torque, supplied from an internal combustion engine mounted on a vehicle (not shown), and the outer stress in the diameter direction are applied to the pulley. Because the housing of a long-sized circumference wall has a relatively high rigidity and the distance between the pulley and the housing having a long-sized circumference wall is reduced, it is possible to prevent any deformation of the housing having a long-sized circumference wall and thereby to decrease the difference between the dual armature cores.

In the tandem AC generator according to another aspect of the present invention, the housing (for example, the front housing) having a long-sized circumference wall has an attachment flange. When compared with that of the short circumference-wall housing (for example, the rear housing), because the attachment flange is fixed to the long circumference-wall housing having an superior rigidity and contacting both of the armature cores, it is possible to decrease the distance between the dual armature cores and a member such as an internal combustion engine to which the attachment flange is connected or attached, and to decrease the amount of displacement of the dual armature cores by vibration and external force based on the position of the member to which the attachment flange is connected. This configuration can thereby increase the vibration proof capability.

In the tandem AC generator according to another aspect of the present invention, the cylindrical spacer and the through bolt are made of steel material. This configuration can increase the rigidity of the entire of the tandem AC generator at a low price. It can efficiently improve a leakage of magnetic flux generated between the dual armature cores by reversing the direction of magnetic flux of the Lundel type field cores.

In the tandem AC generator according to another aspect of the present invention, the armature winding for generating a high voltage is wound on one of the armature cores surrounded in the housing having a long-sized circumference wall. It is thereby possible to improve and increase the electrical safety of the tandem AC generator.

BRIEF DESCRIPTION OF THE DRAWINGS

A preferred, non-limiting embodiment of the present invention will be described by way of example with reference to the accompanying drawings, in which:

FIG. 2 is a schematic cross sectional view showing another configuration of the tandem AC generator observed toward its axis direction according to the embodiment of the present invention.

DETAILED DESCRIPTION OF THE PREFERRED EMBODIMENTS

Figure 1:
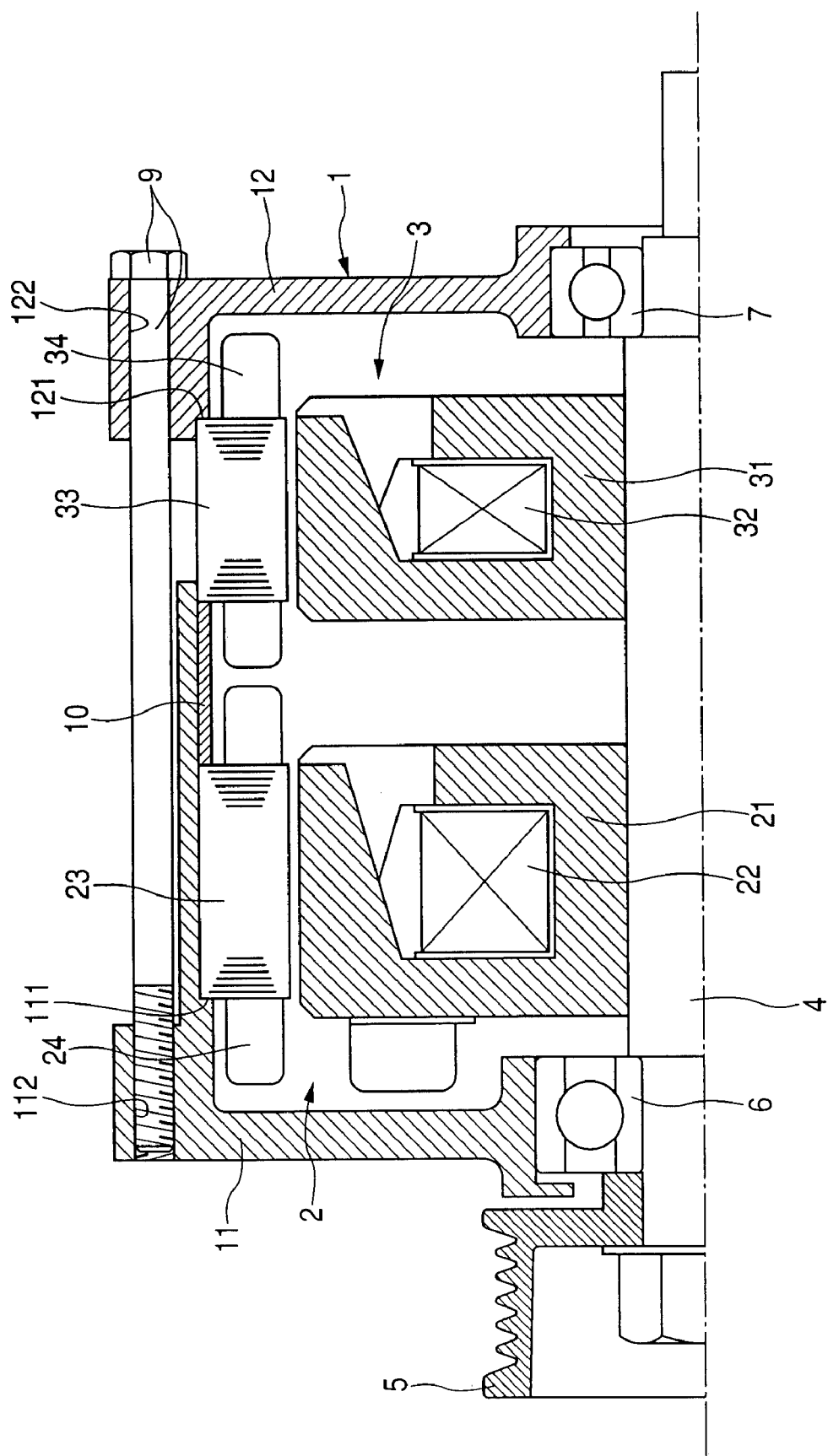
FIG. 1 is a schematic cross sectional view showing a configuration of a tandem AC generator observed toward its axis direction according to an embodiment of the present invention.

Hereinafter, various embodiments of the present invention will be described with reference to the accompanying drawings. In the following description of the various embodiments, like reference characters or numerals designate like or equivalent component parts throughout the several diagrams.

Embodiment

A description will be given of a configuration of a tandem AC generator for a vehicle (or a tandem vehicle alternator in short) according to an embodiment of the present invention (Entire Configuration)

FIG. 1 is a schematic cross sectional view showing a configuration of the tandem AC generator observed in the axis direction thereof according to the embodiment of the present invention.

The tandem AC generator is composed mainly of a housing 1, a primary rotary electric machine unit 2, a secondary rotary electric machine unit 3, a rotary shaft 4 as a common rotary shaft to which a pair of the primary and secondary rotary electric machines 2 and 3 are fixed, a pulley 5, bearings 6 and 7, one or more through bolts 9, and an intermediate ring 10. The intermediate ring 10 corresponds to a cylindrical spacer defined in claims according to the present invention. The explanation for other components such as a rectifier, a regulator and a slip-ring power supply assembly are omitted here for brevity because those components do not relate to the major points of the present invention.

The housing 1 is composed of a front housing 11 and a rear housing 12. For example, the front housing 11 and the rear housing 12 are made of non-magnetic substance. The front housing 11 has a long-sized circumference wall or a long cylindrical-shaped circumference wall. The rear housing 12 has a short-sized circumference wall or a short cylindrical-shaped circumference wall. The front housing 11 and the rear housing 12 are fastened to each other by a through bolt 9. The rotor shaft 4 is supported by the front housing 11 and the rear housing 12 through the bearings 6 and 7. The pulley 5 is fixed to the front part of the rotary shaft 4 which is extending from the front housing 11 to the front of the tandem AC generator.

The primary rotary electric machine unit 2 is composed mainly of a Lundel type rotor core 21, a field winding 22, a stator core 23, and a stator coil 24. The field winding 22 is wound around each part of the Lundel type rotor core 21. The stator core 23 is placed at the outside of the Lundel type rotor core 21 in the diameter direction thereof. The stator coil 24 is wound around the stator core 23.

The secondary rotary electric machine unit 3 is composed mainly of a Lundel type rotor core 31, a field winding 32, a stator core 33, and a stator coil 34. The field winding 32 is wound around each part of the Lundel type rotor core 31. The stator core 33 is placed at the outside of the Lundel type rotor core 31 in the diameter direction thereof. The stator coil 34 is wound around the stator core 33.

The stator coil 24 (as armature winding) supplies an ordinary electric power 12 V to a vehicular battery and other electrical loads. The stator coil 34 supplies an electric power 42V to a vehicular battery and other electrical loads.

The primary rotary electric machine unit 2 and the secondary rotary electric machine unit 3 form a dual rotary electric machine having ordinary Lundel type rotor-core pairs. Accordingly, another detailed configuration of the Lundel AC generator is omitted here for brevity.

(Stator Core Fixing Structure)

A description will now be given of the stator core fixing structure of the stator cores 23 and 33 (as the armature cores) in the tandem AC generator according to the embodiment of the present invention.

The intermediate ring 10 is placed between the armature cores 23 and 33 and acts as a spacer in the axis direction of the tandem AC generator. The intermediate ring 10 is a cylindrical shaped member made of soft magnetic material such as soft magnetic steel.

One end of the intermediate ring is contacted to the outer circumference edge of the rear end surface of the armature core 23, and the other end of the intermediate ring is contacted to the outer circumference edge of the front end surface of the armature core 33.

The armature core 23 is completely inserted into the circumference wall part of the front housing 11 as the housing of a long-sized circumference wall or a long-cylindrical shaped circumference wall. The circumference wall part of the front housing 11 completely surrounds the armature core 23 and reaches to the outer circumference surface of the armature core 33 which is positioned at the rear part of the front housing 11. That is, the circumference wall part of the front housing 11 surrounds a part of the outer circumference surface of the armature core 33.

A step-shaped surface 111 is formed in the circumference wall part of the front housing 11, to which the outer circumference edge part of the armature core 23 is engaged. The circumference wall part of the rear housing 12 as the housing of a short-sized circumference wall or a short-cylindrical shaped circumference wall surrounds a part of the outer circumference surface of the armature core 33. The rear end surface of the circumference wall part of the front housing 11 faces the front end surface of the circumference wall part of the rear housing 12 separated to each other at an axial interval. A step-shaped surface 121 is formed in the circumference wall part of the rear housing, to which the outer circumference edge part of the rear end surface of the armature core 33 is engaged.

The through bolt 9 screws into a female screw hole 112 penetrating the circumference wall part of the front housing 11 in the axis direction through a through hole 122 penetrating the circumference wall part of the rear housing 12 in the axis direction. Similar to an AC generator of a related-art, the front housing 11 and the rear housing 12 are fastened in the axis direction by the through bolt 9. Those front and rear housings 11 and 12 fastened in the axis direction press the armature cores 22 and 33 in the axis direction. The armature cores 23 and 33, the intermediate ring 10, and the front and rear housings 11 and 12 are united to one body.

The important feature of the concept of the present invention is that the outer circumference surface of the armature core 33 is inserted into the inner circumference surface of the circumference wall part of the rear housing 12 and further inserted into the inner circumference surface of the circumference wall part of the front housing 11. This configuration provides the effect of efficiently suppressing a deviation in the diameter direction between the front end part of the circumference wall part of the front housing 11 and the front end part of the rear housing 12. This configuration further provides the effect in which the circumference wall part of the front housing 11 protects the intermediate ring 10 and supports the anti-stress capability to the force applied from the outside of the tandem AC generator. Still further, because the outer circumference surface of the armature core 23 is contacted onto the inner circumference surface of the front housing 11, the thermal radiating capability of the armature core 23 is improved.

Still further, according to the structure of the tandem AC generator of the embodiment of the present invention, because the front housing 11 is arranged at the pulley 5 side, and has a large rigidity and directly contacted to both of the armature core 23 and 33, it is possible to reduce a relative displacement between the armature cores 23 and 33 to be caused by deforming the front and rear housings 11 and 12.

(Modification)

It is possible to modify the configuration of the tandem AC generator according to the embodiment of the present invention shown in FIG. 1.

FIG. 2 is a schematic cross sectional view showing a modification of the tandem AC generator observed in the axis direction according to a modification of the present invention.

As shown in FIG. 2, a front housing 11-1 has an attachment flange part 200. Other components of the tandem AC generator of the modification are the same as those of the tandem AC generator shown in FIG. 1. The explanation for the same components is omitted here.

The tandem AC generator shown in FIG. 2 is attached to an internal combustion engine (not shown) of a vehicle through the attachment flange part 200. The modification of the tandem AC generator increases vibration proof capability, in particular, the vibration proof capability in the radius direction thereof.

(Another Modification)

It is possible to further modify the configuration of the tandem AC generator according to the embodiment of the present invention shown in FIG. 1. For example, it is preferred that the through bolt 9 and the intermediate ring 10 are made of steel material, for example, soft magnetic steel.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A tandem AC generator for a vehicle comprising:
 dual Lundel type field cores, each having a field winding wound thereon, fixed in series to a common rotary shaft;

dual armature cores of a cylindrical shape having an armature winding wound thereon, placed in a diameter direction at an outside of the dual Lundel type field cores, respectively;

front and rear housings of a non-magnetic substance placed in an axis direction at an outside of the dual armature cores, respectively, and forcedly pressing the dual armature cores in the direction of the common rotary shaft by a through bolt, and each housing having an end wall part and a circumference wall part and rotatably supporting the common rotary shaft, an inner circumference surface of the front housing having a step-shaped surface to which a front end surface of one armature core being engaged, and an inner circumference surface of the rear housing having a step-shaped surface to which a rear end surface of the other armature core being engaged; and a ring shaped cylindrical spacer placed between the dual armature cores, wherein:

the front housing and the rear housing accommodate the duel armature cores, the circumference wall part of the front housing having a long-sized circumference wall that accommodates an entire outer circumference of the one armature core and accommodates a part of the outer circumference surface of the other armature core, and being separated in the axis direction at a predetermined interval from the circumference wall part of the rear housing accommodating another part of the outer circumference surface of the other armature core, the inner circumference surface of the front housing has a same diameter from the step-shaped surface of the front housing on a same side as a pulley to an end surface of the front housing at an opposite side to the pulley, the one armature core that is entirely accommodated in the front housing being fixed by both the cylindrical spacer and the step-shaped surface of the front housing, and the front housing having the long-sized circumference wall being structured such that the front housing sets the dual armature cores to have a same radial distance from the common rotary shaft, and the pulley is fixed to the rotary shaft to receive a torque.

2. The tandem AC generator for a vehicle according to claim 1, wherein the front housing having the long-sized circumference wall has an attachment flange.

3. The tandem AC generator for a vehicle according to claim 1, wherein the cylindrical spacer and the through bolt are made of steel material.

4. The tandem AC generator for a vehicle according to claim 2, wherein the cylindrical spacer and the through bolt are made of steel material.

5. The tandem AC generator for a vehicle according to claim 1, wherein the armature winding for generating a high voltage is wound on the one armature core.

6. The tandem AC generator for a vehicle according to claim 2, wherein the armature winding for generating a high voltage is wound on the one armature core.

* * * * *